United States Patent [19]
Huston et al.

[11] 3,794,080
[45] Feb. 26, 1974

[54] CORRUGATED FLEXIBLE HOSE

[75] Inventors: Paul O. Huston, Montville;
Hermann Karl Seipp, Nutley;
Arduino E. Riuli, Wayne, all of N.J.

[73] Assignee: Becton, Dickinson and Company,
East Rutherford, N.J.

[22] Filed: Aug. 18, 1972

[21] Appl. No.: 281,914

[52] U.S. Cl. ............................................. 138/121
[51] Int. Cl. ........................................... F16l 11/00
[58] Field of Search ............ 138/121, 118, 173, 109;
29/454; 92/34

[56] References Cited
UNITED STATES PATENTS
1,547,431   7/1925   Mallory............................ 138/121 X
2,025,067   12/1935  Miller .............................. 138/109 X Primary Examiner—George E. Lowrance
Attorney, Agent, or Firm—Kane, Dalsimer, Kane, Sullivan and Kurucz

[57] ABSTRACT

A corrugated flexible hose of a predetermined length of walled hollow tubular material. The wall includes convolutions of alternate crests and troughs along a substantial portion of its length. The convolutions adjacent at least one end of the wall are dimensionally varied from the remainder of the convolutions of the wall to thereby provide a stiffer portion at least at one end of the hose to facilitate connection to a member while retaining flexibility of the hose.

16 Claims, 2 Drawing Figures

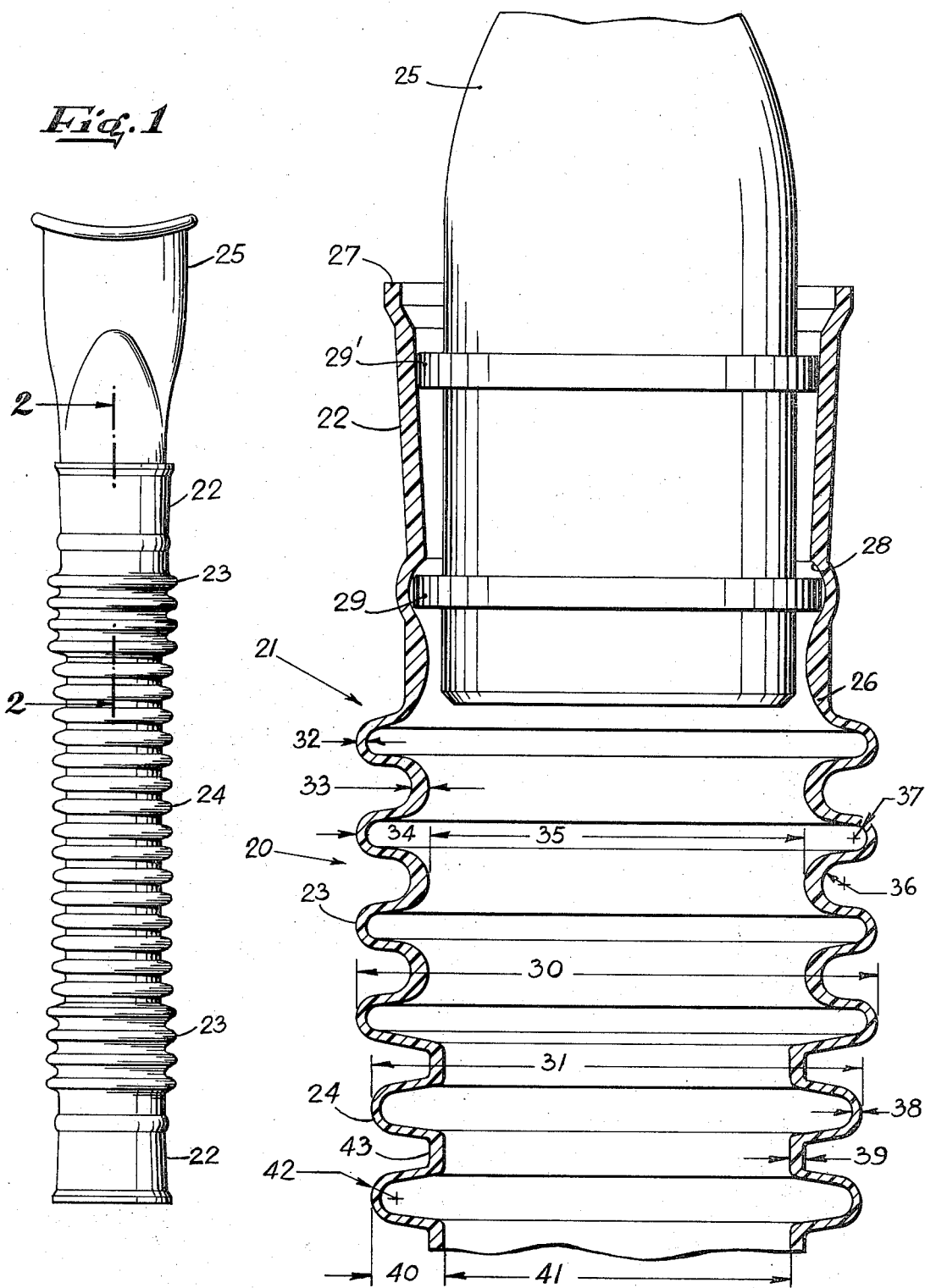

CORRUGATED FLEXIBLE HOSE

BACKGROUND OF THE INVENTION

Low cost flexible tubing which is easy to manufacture and versatile in its use is extremely desirable. It has been found that a plastic molded hose or tube can be manufactured with convolutions or corrugations along its length to give it flexibility and render it useful in many applications. Connecting cuffs can be provided on predetermined lengths of the corrugated tubing for use with various types of equipment such as inhalation therapy systems. A flexible hose of this type is shown and described in U. S. Pat. No. 3,313,319 issued to Osborn et al on April 11th, 1967.

Although the hose material described and defined in that patent is useful as a flexible hose, the degree of flexibility is often inconvenient in some respects. For example when the hose material as taught by the prior art is to be connected to an external member, the flexibility of the material is so great that it becomes unwieldy for the operator to easily connect and disconnect the hose to the external member. This is naturally of great disadvantage in the inhalation therapy field where it is often imperative that the equipment be assembled in a quick and efficient manner to provide aid and assistance to patients. Consequently, it would be extremely advantageous to provide a hose material which retains its flexibility without detracting from rapid interconnection with external members and which has connecting portions which facilitate quick and efficient assembly and disassembly operations.

SUMMARY OF THE INVENTION

With the above background in mind, it is among the primary objectives of the present invention to provide a molded flexible hose material with convoluted or corrugated wall surfaces to provide flexibility and having convolutions of varied dimensions so that the convoluted portions adjacent to each end of the hose material are stiffer to facilitate gripping and interconnection with an external member. Furthermore, extending open ended cuffs are contemplated which are flared toward the open end to facilitate insertion and removal of external members. The end portion of each cuff distal from the open end thereof contains an annular internal locking detent to receive in locking engagement a projection on an external member to facilitate positive assembly of the hose to the external member.

In summary, a corrugated flexible hose of a predetermined length of walled hollow tubular material is provided. The wall of the hose includes convolutions of alternate crests and troughs along a substantial portion of its length. The convolutions adjacent at least one end of the wall are dimensionally varied from the remainder of the convolutions of the wall to thereby provide a stiffer portion at the at least one end of the hose to facilitate connection to a member while retaining flexibility of the hose. With the development of a new geometry for the hose material, the invention achieves an optimized balance of crush resistance, flexibility and compliance.

With the above objectives, among others, in mind, reference is had to the attached drawings.

BRIEF DESCRIPTION OF THE DRAWINGS

In the drawings:

FIG. 1 is a plan view of a flexible corrugated hose of the invention shown connected to an external member; and FIG. 2 is an enlarged fragmentary sectional view thereof.

DESCRIPTION OF THE PREFERRED EMBODIMENT

Hose 20 is a hollow tubular member of predetermined length with a hollow interior through passageway 21. Hose 20 includes a central portion 21 with a corrugated wall surface and a pair of cuffs 22 at the terminal ends with a cylindrical wall surface. Each end portion of corrugated wall 21 contains four convolutions 23 which are dimensioned differently from the convolutions 24 therebetween along the wall surface 21. In turn, each of the convolutions 24 are of substantially the same dimensions and convolutions 23 are all of substantially the same dimensions. The variation in dimensions between convolutions 24 and 23 are to satisfy separate functions. The convolutions 24 are more flexible than the convolutions 23 and retain the inherent flexibility of the convoluted tubing 21. In contrast, the differently dimensioned convolutions 23 are more rigid and make the end portions of the hose more rigid to facilitate gripping and connection to an external member such as mouthpiece 25 as shown in the drawings.

The particular environment in mind with the embodiment depicted would be a hose for use in an inhalation therapy system. By providing convolutions 24 to maintain maximum flexibility while incorporating convolutions 23 at the terminal ends of tube 21, the user is able to maintain a more rigid end portion to the hose to facilitate coupling procedure without material loss of flexibility of the hose 20. It should be kept in mind that, although in the embodiment shown, there are two opposing end portions having convolution types 23 and opposing cuffs 22 extending therefrom, it is possible to envision convolutions 23 at only one end of the hosing and similarly only one cuff employed with the hose. The particular environment in use would naturally determine the arrangement of convolutions and cuffs utilized. Similarly, the fact that there are four convolutions 23 at each end is once again a matter of choice and the ratio of convolutions 23 to convolutions 24 depends upon the particular use and environment.

Turning to consideration of the cuffs 22, the walls of each cuff 22 flare outwardly from their inner end 26 to their open outer end 27. The taper or flare facilitates insertion and removal of an external member such as mouthpiece 25 during assembly of hose 22 in an equipment system. Additionally, adjacent to inner end 26 is an annular locking detent 28 for engagement with a corresponding projection 29 on an external member 25 to lock the external member 25 in position. A second annular projection 29' on the mouthpiece 25 is spaced from the first annular projection 29 and is adapted to engage with the inner wall of cuff 22 to assist in retaining the mouthpiece in fixed position. The external member is inserted through the open terminal end 27 of cuff 22 until its annular projection 29 snaps into locking detent 28 at which time assembly is completed. Normal operating forces will not be sufficient to displace projection 29 from detent 28 and additionally the natural resilience of hose 20 will cause it to neck down when external axial force is applied and assist in retaining external member 25 in locked position. For disassembly purposes, a greater than normal force is employed to axially pull hose 20 and external member 25 is opposite directions and displace projection 29 from detent 28 permitting easy removal of member 25 through the flared opening in cup 22.

Returning to specific dimensions of the convolutions 23 in contrast to the convolutions 24, in general convolutions 23 which are adjacent to each cuff 22 are of larger outside diameter, have greater wall thickness, and are shallower than convolutions 23 thus providing a relatively stiffer section than that in the central portion of hose 20. The stiffer section facilitates assembly of the hose to an external rigid member as discussed above. The development of a new geometry for the convolutions in regard to dimensions and axial relationship, an optimized balance of crush resistance, flexibility and compliance is achieved.

As shown, convolutions 23 have a greater outer diameter 30 than the outer diameter 31 of convolutions 24.

Although variations are readily apparent, the following dimensional criteria for convolutions 23 and 24 have been found to work satisfactorily in the present design. In regard to the stiffer convolutions 23, the wall thickness at the crest 32 is nominally 0.020 inches. In contrast, the wall thickness at the root or trough 33 is nominally 0.028 inches. Therefore, in general the crest thickness 32 is approximately two-thirds that of the root or trough thickness 33.

The convolution depth 34 of each convolution 23 is approximately 14 percent of the internal diameter 35 of hose 20. The respective radii of convolutions 23 are in a ratio whereby the internal radii 36 of the roots or troughs are approximately two-and-a-half times that of the internal radii 37 of the crests.

In contrast, the more flexible convolutions 24 have been found to work satisfactorily with the following dimensional criteria. The wall thickness of crest 38 of each convolution 24 is nominally 0.008 inches and the wall thickness of trough 39 of each convolution 24 is nominally 0.028 inches. In general, the crest thickness 38 is approximately one quarter to one third of the root or trough thickness 39. The convolution depth 40 of each convolution 24 is approximately 22 percent of the internal diameter 41 of hose 20. Finally, the radii of the individual convolutions 24 are dimensioned as follows. Each crest 38 has an outside radius 42 of approximately 0.045 inches and each root or trough 39 is flat and parallel to the axis of hose 20.

Hose 20 is constructed of a molded plastic material and as discussed above can be dimensioned in respect to the corrugated portion and the cuffs as required.

Thus, the above discussed objectives of the invention, among others, are effectively attained.

We claim:

1. A corrugated flexible hose comprising: a predetermined length of walled hollow tubular material, the walls including convolutions of alternate crests and troughs along a substantial portion of its length, the convolutions adjacent at least one end of the wall being of uniform dimension and being dimensionally varied from the remainder of the uniformly dimensioned convolutions of the wall so as to provide a stiffer portion at said at least one end of the hose to facilitate connection to a member while retaining flexibility of the hose and retaining relative uniform dimensioning of the hose by utilizing only two different size convolutes along the length of the hose.

2. The invention in accordance with claim 1 wherein the convolutions adjacent at least one end of the wall are shallower than the remainder of the convolutions of the wall.

3. The invention in accordance with claim 2 wherein the depth of the convolutions adjacent at least one end of the wall is approximately 14 percent of the internal diameter of the hose and the depth of the remainder of the convolutions is approximately 22 percent of the internal diameter of the hose.

4. The invention in accordance with claim 1 wherein at least one end of the hose terminates in a hollow open ended cuff to facilitate removable connection of the hose to a member.

5. The invention in accordance with claim 4 wherein the at least one cuff is flared outwardly toward the open end thereof and contains an annular internal detent adjacent to the convolutions of the hose to receive a corresponding projection on a member and facilitates removable connection of the hose to the member.

6. The invention in accordance with claim 1 wherein the hose is constructed of a plastic material.

7. A corrugated flexible hose comprising: a predetermined length of walled hollow tubular material, the wall including convolutions of alternate crests and troughs along a substantial portion of its length, the convolutions adjacent at least one end of the wall being a larger outside diameter, of greater wall thickness, and shallower than the remainder of the convolutions of the wall thereby providing a stiffer portion of the hose to facilitate removable connection to a member while retaining flexibility of the hose.

8. The invention in accordance with claim 7 wherein the convolutions adjacent at least one end of the wall include a crest wall thickness of approximately 0.020 inches and a trough wall thickness of approximately 0.028 inches and a convolution depth of approximately 16 percent of the internal diameter of the hose, the remaining convolutions of the wall including a crest wall thickness of approximately 0.008 inches and a trough wall thickness of approximately 0.028 inches and a convolution depth of approximately 19 percent of the internal diameter of the hose.

9. The invention in accordance with claim 7 wherein the convolutions adjacent at least one end of the wall include troughs with internal radii approximately two-and-a-half times that of the internal radii of the crests thereof, and the remainder of the convolutions including crests with outside radii approximately 0.045 inches and flat troughs parallel to the longitudinal axis of the hose.

10. The invention in accordance with claim 7 wherein there is at least one open ended hollow cuff extending from a terminal end of the hose to facilitate removable connection to a member.

11. The invention in accordance with claim 10 wherein at least one cuff is flared outwardly toward the open end thereof and includes an annular locking detent therein adjacent to the convolutions of the hose and adapted to receive a corresponding projection on a member removably connected to the hose.

12. The invention in accordance with claim 15 wherein the hose is constructed of a plastic material.

13. A corrugated flexible hose comprising: a predetermined length of walled hollow tubular material, the walls including convolutions of alternate crests and troughs along a substantial portion of its length, the convolutions adjacent at least one end of the wall being dimensionally varied from the remainder of the convolutions of the wall so as to provide a stiffer portion at said at least one end of the hose to facilitate connection to a member while retaining flexibility of the hose, and the convolutions adjacent at least one end of the wall being of larger outside diameter than the remainder of the convolutions of the wall.

14. A corrugated flexible hose comprising: a predetermined length of walled hollow tubular material, the walls including convolutions of alternate crests and troughs along a substantial portion of its length, the convolutions adjacent at least one end of the wall being dimensionally varied from the remainder of the convolutions of the wall so as to provide a stiffer portion at said at least one end of the hose to facilitate connection to a member while retaining flexibility of the hose, and the convolutions adjacent at least one end of the wall being of larger outside diameter than the remainder of the convolutions of the wall, the convolutions adjacent at least one end of the wall having troughs with internal radii approximately two-and-a-half times that of the crests and the remainder of the convolutions having crests with outside radii of approximately 0.045 inches and troughs that are flat and parallel to the axis of the hose.

15. A corrugated flexible hose comprising: a predetermined length of walled hollow tubular material, the walls including convolutions of alternate crests and troughs along a substantial portion of its length, the convolutions adjacent at least one end of the wall being dimensionally varied from the remainder of the convolutions of the wall so as to provide a stiffer portion at said at least one end of the hose to facilitate connection to a member while retaining flexibility of the hose, and the convolutions adjacent at least one end of the wall being of greater wall thickness than the remainder of the convolutions of the wall.

16. A corrugated flexible hose comprising: a predetermined length of walled hollow tubular material, the walls including convolutions of alternate crests and troughs along a substantial portion of its length, the convolutions adjacent at least one end of the wall being dimensionally varied from the remainder of the convolutions of the wall so as to provide a stiffer portion at said at least one end of the hose to facilitate connection to a member while retaining flexibility of the hose, and the convolutions adjacent at least one end of the wall being of greater wall thickness than the remainder of the convolutions of the wall, the wall thickness of the convolutions adjacent at least one end of the wall including a crest wall thickness of approximately 0.020 inches and a trough wall thickness of approximately 0.028 inches and the remainder of the convolutions including a crest wall thickness of approximately 0.008 inches and a trough wall thickness of approximately 0.028 inches.

* * * * *